United States Patent
Pisani

(10) Patent No.: US 10,663,398 B2
(45) Date of Patent: May 26, 2020

(54) SYSTEM FOR DETERMINING THE CHARACTERISTICS OF A GAS AND RELATED METHOD FOR MEASURING SUCH CHARACTERISTICS

(71) Applicant: INRIM, Turin (IT)

(72) Inventor: Marco Pisani, Turin (IT)

(73) Assignee: INRIM, Turin (IT)

( * ) Notice: Subject to any disclaimer, the term of this patent is extended or adjusted under 35 U.S.C. 154(b) by 0 days.

(21) Appl. No.: 16/066,002

(22) PCT Filed: Dec. 16, 2016

(86) PCT No.: PCT/IT2016/000294
§ 371 (c)(1),
(2) Date: Jun. 25, 2018

(87) PCT Pub. No.: WO2017/109804
PCT Pub. Date: Jun. 29, 2017

(65) Prior Publication Data
US 2019/0011363 A1 Jan. 10, 2019

(30) Foreign Application Priority Data
Dec. 24, 2015 (IT) .................. 102015000087770

(51) Int. Cl.
*G01N 21/00* (2006.01)
*G01N 21/51* (2006.01)
(Continued)

(52) U.S. Cl.
CPC ............... *G01N 21/51* (2013.01); *G01N 1/28* (2013.01); *G01N 21/47* (2013.01); *G01N 21/49* (2013.01); *G01N 2021/1744* (2013.01)

(58) Field of Classification Search
CPC .. G01N 21/3504; G01N 21/39; G01N 21/359; G01N 21/51; G01N 21/65;
(Continued)

(56) References Cited

U.S. PATENT DOCUMENTS 5,024,526 A * 6/1991 von Redwitz ......... G01N 21/53
356/339
5,786,893 A * 7/1998 Fink ....................... G01N 21/65
356/301
(Continued)

FOREIGN PATENT DOCUMENTS

WO 2017109804 A1 6/2017

OTHER PUBLICATIONS

International Search Report and Written Opinion dated May 29, 2017 cited in Application No. PCT/IT2016/000294, 20 pgs.
(Continued)

*Primary Examiner* — Hoa Q Pham
(74) *Attorney, Agent, or Firm* — Bekiares Eliezer LLP

(57) ABSTRACT

A system for determining the characteristics of a gas is described, comprising at least one beam of coherent and monochromatic light, detecting means of scattered light comprising at least one photo-detector, at least one measuring chamber within which the beam and the detecting means are operating, and control means operatively connected to the photo-detector for recording an amount of scattered light according to the Rayleigh scattering principle depending on the physical characteristics of the gas molecule and on a wavelength of the coherent and monochromatic light, the beam of coherent and monochromatic light being emitted by at least one laser with continuous wave. A method for measuring the characteristics of a gas through such system is further described.

10 Claims, 4 Drawing Sheets

(51) Int. Cl.
*G01N 21/47* (2006.01)
*G01N 21/49* (2006.01)
*G01N 1/28* (2006.01)
*G01N 21/17* (2006.01)

(58) Field of Classification Search
CPC .. G01N 1/28; G01N 2021/1744; G01N 21/47; G01J 3/44; G01J 3/42
USPC ......... 356/432–440, 335–343, 319, 326, 301
See application file for complete search history.

(56) References Cited

U.S. PATENT DOCUMENTS

| | | | |
|---|---|---|---|
| 6,903,818 B2* | 6/2005 | Cerni | G01N 15/14 250/341.8 |
| 2005/0179904 A1* | 8/2005 | Larsen | G01N 21/0303 356/446 |
| 2009/0079981 A1* | 3/2009 | Holve | G01N 15/0205 356/336 |
| 2010/0243898 A1* | 9/2010 | Kato | G01N 21/53 250/338.5 |
| 2015/0338336 A1* | 11/2015 | Dobrinsky | C02F 1/325 250/430 |
| 2016/0146668 A1* | 5/2016 | Hatahori | G01J 3/0218 356/301 |

OTHER PUBLICATIONS

International Preliminary Report on Patentability dated Jun. 26, 2018 cited in Application No. PCT/IT2016/000294, 16 pgs.

Zhao et al., "The Applications of Laser Rayleigh Scattering to Combustion Diagnostics", Prog. Energy Combust. Sci., vol. 19, Issue 6, 1993, pp. 447-485 (16 pgs.).

Bryner et al., "A Rayleigh light scattering facility for the investigation of free jets and plumes," Rev. Sci. Istrum., vol. 63, No. 7, 1992, pp. 3629-3635.

Shirinzadeh et al., "Planar Rayeigh scattering results in helium-air mixing experiments in a Mach-6 wind tunnel," Applied Optics, vol. 31, No. 30, Oct. 20, 1992, pp. 6529-6534.

Adam et al., "Visualization of the evaporation of a diesel spray using combined Mie and Rayleigh scattering techniques", Springer, Experiments in Fluids, vol. 47, Issue 3, 2009, pp. 439-449.

Zhao et al., "Optical diagnostics for in-cylinder mixture formation measurements in IC engines", Progress in Energy and Combustion Science, 1998 Elsevier Science Ltd.,vol. 24, Issue 4, pp. 297-336.

Stepaniuk et al., "Measurement of gas temperature and convection velocity profiles in a dc atmospheric glow discharge", Journal of Applied Physics, 2007 American Institute of Physics, vol. 102, Issue 12, pp. 123302-123302-5.

Frank et al., "High-resolution imaging of turbulence structures in jet flames and non-reacting jets with laser Rayleigh scattering", Experiments in Fluids, Springer-Verlag, Jul. 23, 2010, vol. 49, pp. 823-837, DOI 10.1007/s00348-010-0931-z.

Mielke et al., "Development of a Rayleigh Scattering Diagnostic for Time-Resolved Gas Flow Velocity, Temperature, and Density Measurements in Aerodynamic Test Facilities", IEEE, 2007, 15 pgs.

Seasholtz et al., "Spectrally Resolved Rayleigh Scattering Diagnostic for Hydrogen-Oxygen Rocket Plume Studies", Journal of Propulsion and Power, vol. 8, No. 5, Sep.-Oct. 1992, pp. 935-942.

Schefer et al., "Investigation of small-scale unintended releases of hydrogen: Buoyancy effects", International Journal of Hydrogen Energy, vol. 33, Issue 17, 2008, pp. 4702-4712.

* cited by examiner

SYSTEM FOR DETERMINING THE CHARACTERISTICS OF A GAS AND RELATED METHOD FOR MEASURING SUCH CHARACTERISTICS

BACKGROUND OF THE INVENTION

1) Field of the Invention

The present invention refers to a system for determining the characteristics of a gas and to a related method for measuring such characteristics.

In particular, the present invention refers to a pressure transducer of a gas, according to the Rayleigh scattering principle.

2) Background Art

Pressure transducers are divided into several categories, generally specific for different pressure ranges. The most common transducers in industrial and scientific fields are:
- transducers with a liquid column, such as a mercury column, nowadays scarcely used;
- mechanical transducers based on the mechanical measure of a distortion, among which the main ones are:
  - the Bourdon manometer, composed of a curved metallic tube which tends to be straightened when it is filled with a pressurized gas: its distortion, proportional to the pressure, is then measured by an index;
  - the membrane manometer, in which a membrane or bellows separate the part exposed to a gas to be measured from a chamber in which vacuum is kept: the elastic distortion of the membrane is then proportional to the pressure. Both above manometers are widely used in industrial applications needing a mean or low accuracy;
- electrical transducers based on the electrical measure of the mechanical distortion of a membrane through strain gauges or capacitive sensors. They are most widely used in scientific or industrial applications with high accuracy. Sturdy, but with a measuring range which is not wide, they are designed for working in specific measuring ranges, for example 1-1300 Pa, or 10-100 kPa, or 90-1000 kPa, and below them, they are not accurate, while above they saturate;
- Pirani sensor, based on the measure of a heating of a filament in which a current passes and placed in the gas to be measured: its operation is based on the principle that the lower the pressure is, the lower the heat dissipation is, while the greater the filament temperature is. It has a wide measuring range, but it is scarcely accurate;
- "spinning rotor", wherein a magnetically suspended sphere is rotated at high speed: in such instrument, the rotation slowing-down depends on gas viscosity and therefore on pressure. It is accurate, but very complex and costly;
- Rayleigh scattering, which is based on the principle according to which, when an electromagnetic radiation, such as a beam of light, crosses a gas, gas molecules oscillate at the frequency of the electric field and irradiate part of the incident energy. In practice, a very small portion of the energy of the luminous beam is scattered along all directions by the gas molecules. The Rayleigh Law describes the relationship between incident light and scattered light:

$$I = I_0 \frac{8\pi^4 \alpha^2}{\lambda^4 R^2}(1 + \cos^2\theta)$$

in which the intensity of the scattered light I is proportional to the number of molecules, to the polarization capability of molecule $\alpha$, to the wavelength $\lambda$ and to the power of the incident radiation I0. Therefore, if these parameters are constant, the scattered light depends on the number of molecules in the observed volume unit, namely on the gas density in moles/m3.

In turn, the gas density is proportional to pressure and temperature, from the Law of Gases. Therefore, if the temperature is known, the gas pressure can be estimated from the scattered radiation.

A problem dealing with a pressure transducer for a gas, according to the Rayleigh scattering principle, is ensuring an absolute estimation of the pressure value linearly proportional to the measured radiation. Due to this, it is necessary to exactly know the interaction volume and to measure all the scattered radiation. In practice, both things are difficult to estimate with enough accuracy, because the measuring volume is not defined by an exact geometry, depending on the size of the laser beam. Moreover, the radiation measuring system has an efficiency which is difficult to theoretically estimate. The prior art is given by several patents.

In particular, patent JPH0894475A discloses a device and a method for measuring the pressure of a gas by detecting a laser light scattered by a gas. The device comprises a closed measuring chamber connected to a vacuum chamber through a flange. A laser light emitted by a laser source composed of a semiconductor is collimated and introduced into the measuring chamber through a window. In this way, particles of that gas are subjected to Rayleigh scattering. The number of scattered photons, proportional to the gas molecule density, allows measuring the gas molecule density itself. The scattered light is condensed through an optical condenser and then converted into an electric signal through a detector. The electric signal is supplied through a current/voltage conversion circuit connected to a computer.

Patent JPH0894475A discloses a device based on a pulse-type source of green laser light, wherein the detector for converting the optical beam into an electric signal is a photo-multiplier and the measuring interval of the pressure value ranges from 1 to 100 Kpa. Instead, nowadays it would be advisable to use a blue light of a DC laser, CW laser, less costly, with a normal photodiode, less costly and with more dynamics. Moreover, it would be possible to increase, even a lot, the threshold of the maximum pressure value of the measured gas.

SUMMARY OF THE INVENTION

Therefore, object of the present invention is solving the above prior art problems by providing a system for determining the characteristics of a gas which results in a performing device, capable of measuring pressure values equal to several atmospheres of the gas by raising the maximum pressure threshold and reducing at the same time the production costs.

A further object is providing a system for determining the characteristics of a gas capable of exploiting the linearity of the scattered light/pressure relationship, to be able to exactly calibrate a pressure transducer.

The above and other objects and advantages of the invention, as will appear from the following description, are obtained with a system for determining the characteristics of a gas as claimed in claim 1.

Moreover, the above and other objects and advantages of the invention, as will result from the following description, are obtained with a method for measuring the characteristics of a gas as claimed in claim 6.

Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
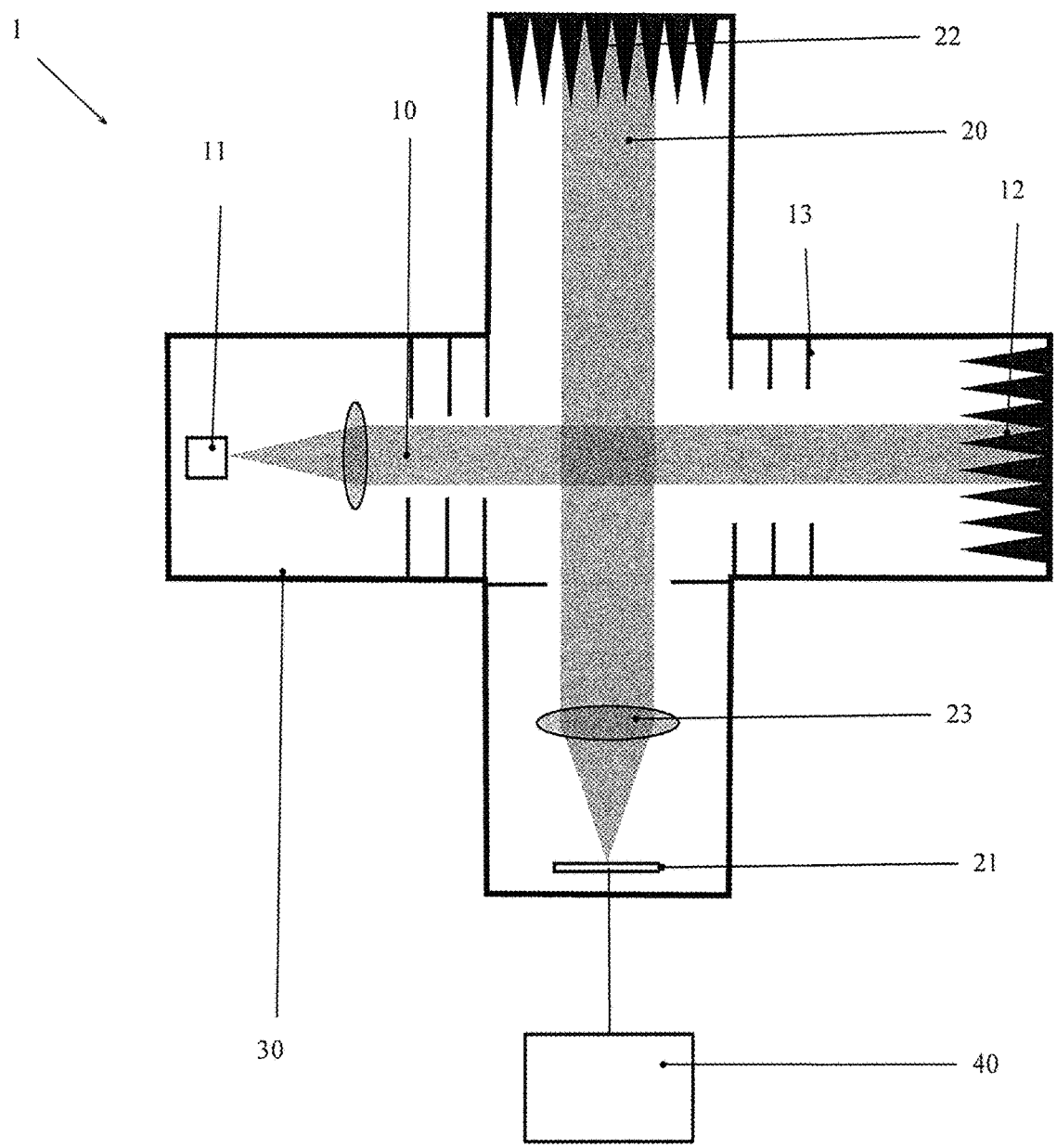
FIG. 1 shows a diagram of a first preferred embodiment of the system for determining the characteristics of a gas according to the present invention.
Figure 2:
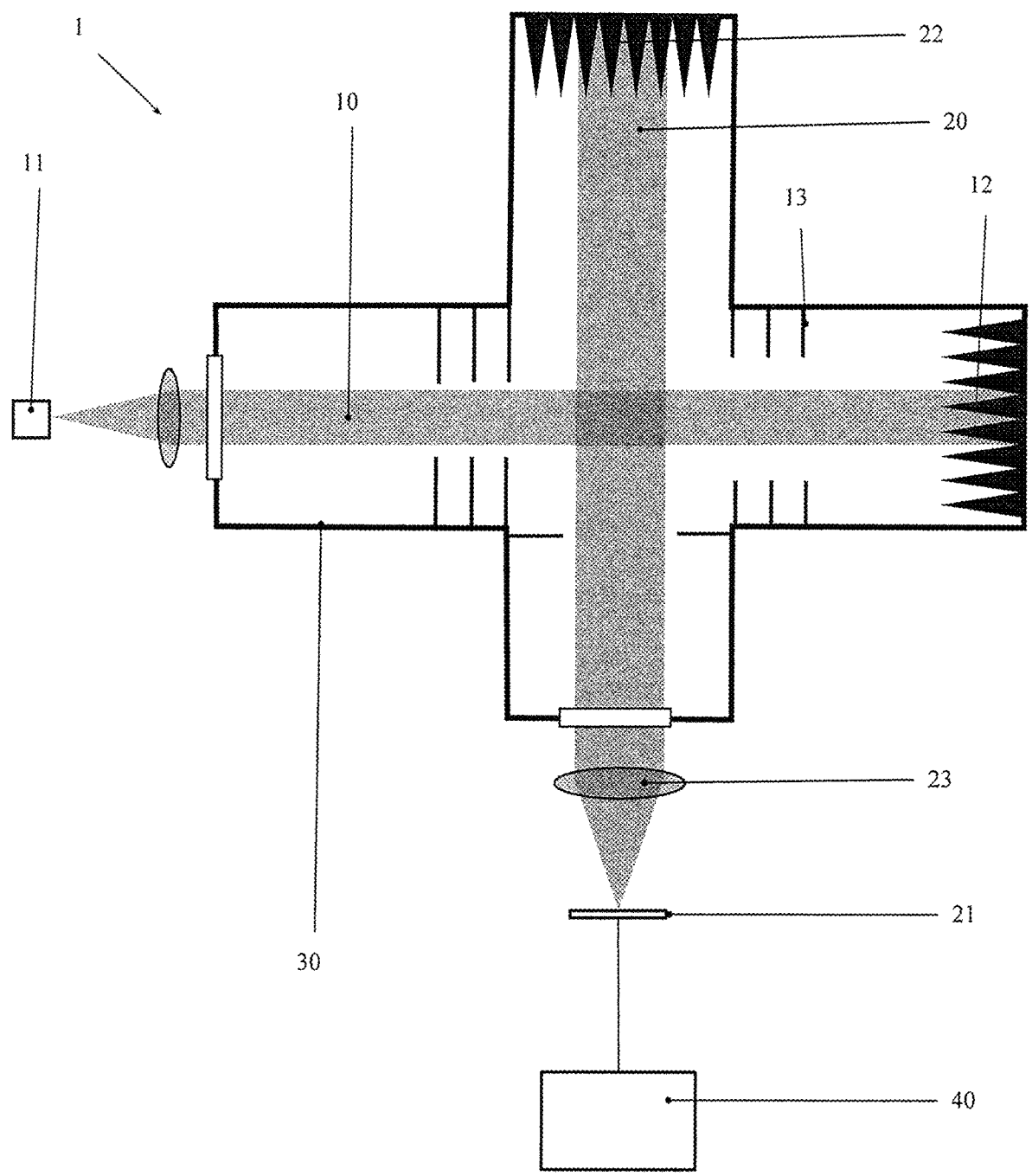
FIG. 2 shows a diagram of a second preferred embodiment of the system for determining the characteristics of a gas according to the present invention.

With reference to FIGS. 1 and 2, it is possible to note that a system 1 for determining the characteristics of a gas according to the present invention comprises at least one beam 10 of coherent and monochromatic light, and detecting means 20 comprising at least one photo-detector 21. Moreover, the system 1 according to the present invention comprises at least one measuring chamber 30, for example connected to at least one vessel (not shown) containing such pressurized gas, within which the beam 10 and the detecting means 20 are operating.

In particular, the system 1 according to the present invention further comprises control means 40 operatively connected to the photo-detector 21 for recording an amount of scattered light according to the Rayleigh scattering principle, depending on the sizes of the gas molecule and on the wavelength of the coherent and monochromatic light.

Advantageously, the beam 10 of coherent and monochromatic light is emitted by at least one laser 11 with continuous wave. Moreover, the laser 11 and the photo-detector 21 can both be fastened with respect to the measuring chamber 30 to allow the connection of such system 1 with respect to the vessel containing pressurized gas.

According to a first preferred embodiment of the system 1 according to the present invention, laser 11 and photo-detector 21 are integrated within the measuring chamber 30, as shown, for example, in FIG. 1.

Alternatively, as shown, for example, in FIG. 2, it is possible to provide that laser 11 and photo-detector 21 are placed outside the measuring chamber 30, the beam 10 and the detecting means 20 operating thereby within the measuring chamber 30 itself through respective windows.

Figure 3:
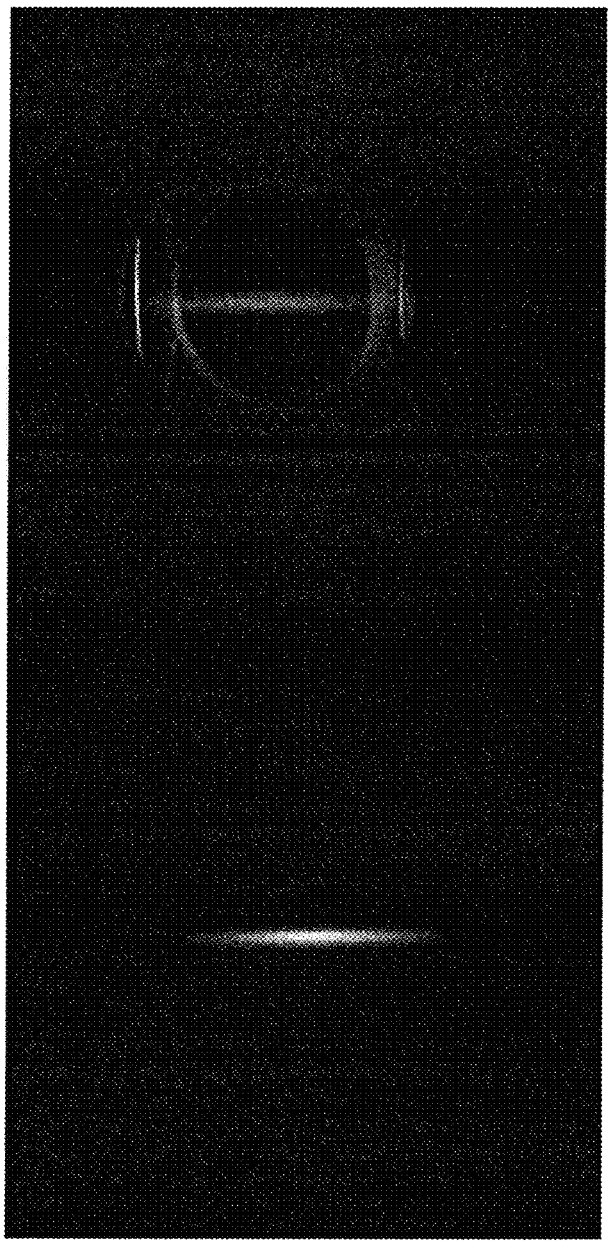
FIG. 3 shows an image taken with a videocamera of the interaction area between laser and gas inside a system according to the present invention.

The measuring chamber 30 can further comprise therein absorbing means 12, 22, arranged at the opposite end with respect to the laser 11 and the photo-detector 21. Moreover, the measuring chamber 30 comprises screening means 13 arranged along the path of the beam 10 to contain the scattered light along random directions from the measuring chamber 30. The absorbing means 12, 22 are coloured in black to allow recording the beam of scattered light through at least one videocamera or a photo-detector, as shown, for example, in FIG. 3.

Preferably, the laser 11 is of the type with short wavelength, blue, violet or UV, in order to have a scattered light with a greater signal and whose power is on the order of 100 mW.

The photo-detector 21 is composed of an array of photo-detecting devices, CCD or CMOS type, for converting light into an electric signal and for allowing to detect the shape of the geometric locus of the beam of scattered light, through one or more optical lenses 23 adapted to collect the scattered light from the molecules stricken by the beam 10 of coherent and monochromatic light and focus such scattered light within a solid angle on the array of the photo-detector 21.

The control means 40 allow keeping the output power constant through an amplitude stabilizing system operating on the driving current.

The control means 40 allow measuring the light intensity and adjusting the exposure time so that the photo-detector 21 always operates within its own measuring range. In particular, the control means 40 allow computing the gas pressure value depending on a Calibration Coefficient (CC) and on the composition of the suitably inserted gases.

A method for measuring the characteristics of a gas, through such system 1, is based on the fact that the Calibration Coefficient (CC) is obtained by measuring the response to a known pressure through comparison with a sample.

The system 1 for determining the characteristics of a gas of the present invention allows reaching the above stated objects.

The system 1 according to the present invention can thereby comprise, in order to obtain the above described components, for example, a collimated laser source, a measuring chamber, a system for collecting and measuring the scattered light. The control means operatively connected to the photo-detector can comprise a stabilizer, whose power is the laser one, a measuring device of the laser power, a measuring device of the gas temperature, and an electronic processing unit. Possibly, such system 1 can comprise one or more of the following accessories: absorbing means of the direct laser radiation, screening means arranged along the path of the beam to contain the scattered light along random directions within the measuring chamber, a light trap to reduce the "zero" radiation.

The laser is preferably a short wavelength (blue, violet or UV) one, since the scattered light is proportional to $1/\lambda^4$, and therefore short wavelengths generate stronger signals, whose power is medium (on the order of 100 mW). The laser is coupled with a system of lenses, which generates a collimated beam of light. The measuring chamber is a watertight environment in communication with the gas to be measured, in which laser light enters through a window, or directly if the laser is placed inside the chamber and supplied through watertight electric passages. The light collecting system, through these one or more optical lenses 23, collects the scattered light from the molecules stricken by the beam laser within a solid angle and conveys light on the photo-detector 21 composed of an array of photo-detecting devices, CCD or CMOS type, which convert light into an electric signal. Also in this case, the system 1 according to the present invention can be directly integrated into the measuring chamber and connected outside through watertight electric passages, or can collect light through a window.

Figure 4:
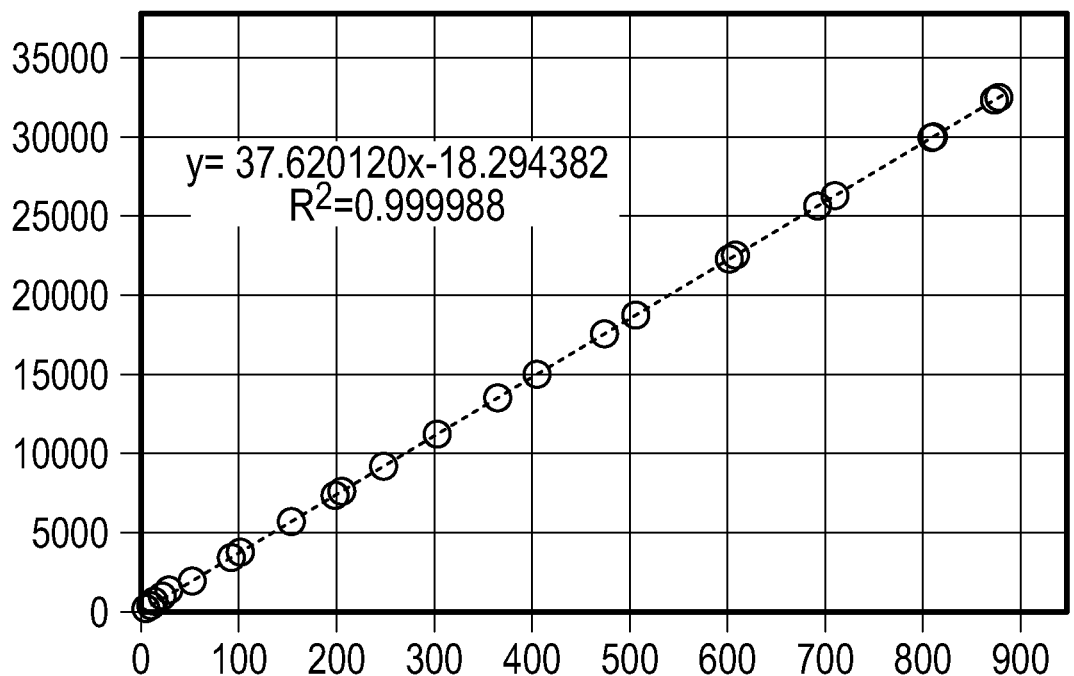
FIG. 4 shows a graph including experimental results at high pressures up to 850 kPa.
Figure 5:
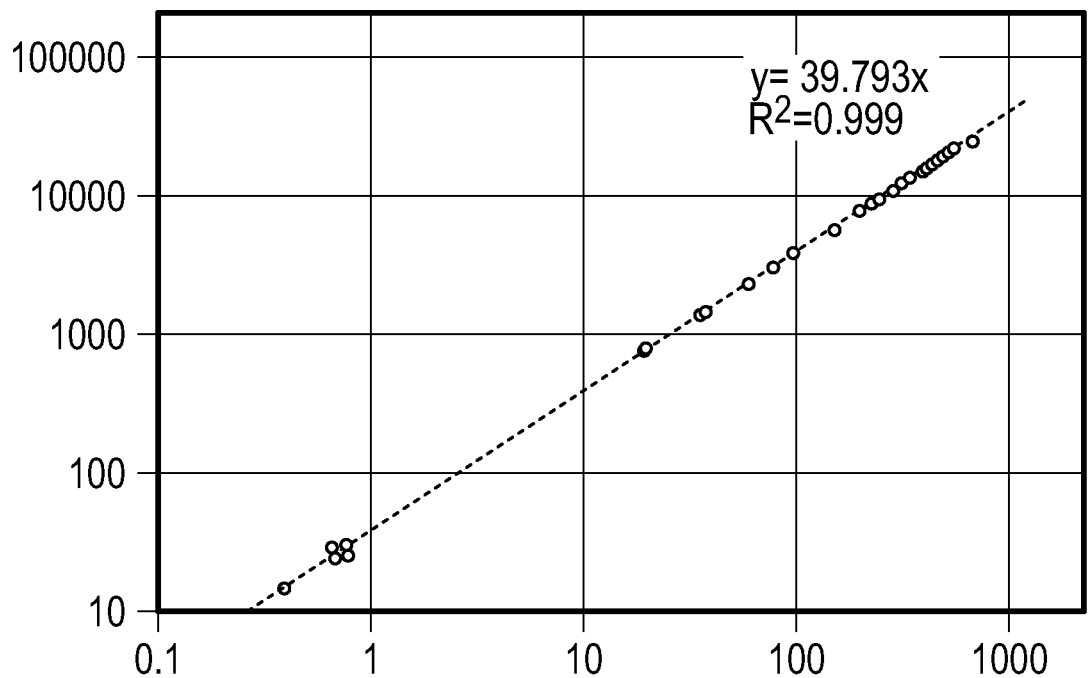
FIG. 5 shows a graph including experimental results at low pressures from 0.3 to 800 Pa.

Particular attention must be paid to limit the scattered light from the physical parts, which could impair the measure of interest. In particular, from the laser source, in addition to the collimated beam, beam of lights are produced whose intensity is lower along random directions. To avoid that such beams are collected by the photo-detector 21, it is necessary to introduce a series of screens, which let only collimated light pass, absorbing the remaining light. Moreover, the laser light of the main beam must be absorbed by a suitable "trap", so that light is not reflected backwards towards the measuring area. Finally, always to minimize spurious light, a trap of light arranged in opposition to the chamber helps minimizing the number of spurious photons coming from the measuring direction. The laser power directly affects the measure of the scattered radiation, and therefore must be kept under control. Alternatively, it is possible to keep the output power constant through an amplitude stabilizing system, which measures the power and operates on the driving current, or more simply the laser power can be measured with a suitable photo-detector and this value can be used for the post-correction of the results. The processing system manages the photo-detector 21, measures the light intensity, adjust the exposure time so that the photo-detector is always within its measuring range. Finally, it standardizes the measure of the scattered light for the preset exposure time, possibly corrects the variations whose power is of the laser and computes the pressure depending on the Calibration Coefficient and on the composition of the suitably inserted gases, as shown, for example, in FIGS. 4 and 5.

The system 1 according to the present invention therefore has the following properties:
  extremely wide dynamic range (greater than $10^6$). The dynamic range is limited by the measuring capability of the photo-detector, whose integration time can be changed at will;
  high linearity. The measure is based on a linear physical principle;
  high speed. Since there are no mechanical parts, speed is limited only by the time for measuring the light;
  easy calibration. Due to its high linearity, it is enough to measure a point of the curve to know the characteristic of the system 1 in its whole measuring range;
  high stability in time. Absence of mechanical moving parts;
  potential use as sample measuring device.

With suitable arrangements, it is possible to accurately define the measuring volume and the absolute efficiency of the system for collecting the photons. In this case, it is possible to directly apply the Rayleigh formula and know the pressure without the need of a comparison with a reference transducer.

The invention claimed is:

1. A system for determining the characteristics of a pressurized gas contained therein comprising:
  at least one continuous wave laser which emits at least one incident beam of coherent and monochromatic light, the laser being of a type with short wavelength, blue, violet or UV, to have a scattered light with a greater signal and whose power is on the order of 100 mW;
  at least one optical lens;
  scattered light detecting means of scattered light, the detecting means comprising at least one photo-detector, the photo-detector being composed of an array of photo-detecting devices, CCD or CMOS type, for converting light into an electric signal and allowing to detect the shape of the geometric locus of a beam of scattered light, through the one or more optical lenses adapted to collect the scattered light from molecules on which the beam of coherent and monochromatic light is incident and to focus it within a solid angle onto the array of the photo-detector;
  at least one measuring chamber containing the pressurized gas, the at least one beam, the detecting means and the at least one lens are being located within the at least one measuring chamber, the measuring chamber being elongated and comprising therein light absorbing means arranged at an opposite end with respect to the laser and the photo-detector;
  screening means which are arranged along the path of the incident beam to prevent light scattered in random directions in the measuring chamber from reaching the detecting means, the absorbing means being colored black; and
  control means operatively connected to the photo-detector for recording an amount of scattered light according to the Rayleigh scattering principle depending on the physical characteristics and on the pressure or density of the molecules of the gas, and on a wavelength of the coherent and monochromatic light, the control means measuring the light intensity and regulating the exposure time of the photodetector so that the photo-detector always operates within its own measuring range, the control means computing the gas pressure value depending on a Calibration Coefficient, CC, and on the composition of inserted gases;
    wherein the system further comprises additional light absorbing means of the direct laser radiation placed inside the measuring chamber and facing the photo-detector on an opposite side of the incident laser beam.

2. The system of claim 1, wherein the measuring chamber is connected to at least one vessel containing the pressurized gas.

3. The system of claim 2, wherein the laser and the photo-detector are fastened with respect to the measuring chamber to allow a connection of the system with respect to the vessel.

4. The system of claim 1, wherein the control means allow keeping the output power constant through an amplitude stabilizing system operating on the driving current.

5. The system of claim 4, wherein the control means allow measuring the light intensity and adjusting the exposure time so that the photo-detector always operates within its own measuring range and in that the control means allow computing the gas pressure value depending on a Calibration Coefficient, CC, and on the composition of suitably inserted gases.

6. A method for measuring the characteristics of a gas, through the system of claim 1, wherein the Calibration Coefficient, CC, is obtained by measuring the response to a known pressure by comparison with a sample.

7. The method of claim 6, wherein the measuring chamber of the system is connected to at least one vessel containing the pressurized gas.

8. The method of claim 7, wherein the laser and the photo-detector are fastened with respect to the measuring chamber to allow a connection of the system with respect to the vessel.

9. The method of claim 6, wherein the control means allow keeping the output power constant through an amplitude stabilizing system operating on the driving current.

10. The method of claim 9, wherein the control means allow measuring the light intensity and adjusting the exposure time so that the photo-detector always operates within its own measuring range and in that the control means allow computing the gas pressure value depending on a Calibration Coefficient, CC, and on the composition of suitably inserted gases.

* * * * *